US010578062B2

(12) United States Patent
Wolgamott (10) Patent No.: US 10,578,062 B2
(45) Date of Patent: Mar. 3, 2020

(54) MASS AIRFLOW SENSOR SIGNAL PROCESSING METHOD

(71) Applicant: Nikolas James Wolgamott, Grand Ledge, MI (US)

(72) Inventor: Nikolas James Wolgamott, Grand Ledge, MI (US)

(73) Assignee: NJK Precision LLC, Eaton Rapids, MI (US)

(*) Notice: Subject to any disclaimer, the term of this patent is extended or adjusted under 35 U.S.C. 154(b) by 404 days.

(21) Appl. No.: 15/404,607

(22) Filed: Jan. 12, 2017

(65) Prior Publication Data

US 2017/0241383 A1    Aug. 24, 2017

Related U.S. Application Data

(60) Provisional application No. 62/278,211, filed on Jan. 13, 2016.

(51) Int. Cl.
| | |
|---|---|
| G01F 1/12 | (2006.01) |
| G01F 1/50 | (2006.01) |
| G01F 25/00 | (2006.01) |
| F02M 35/10 | (2006.01) |
| F02D 41/18 | (2006.01) |

(Continued)

(52) U.S. Cl.
CPC ....... F02M 35/10386 (2013.01); F02D 41/18 (2013.01); F02D 41/28 (2013.01); G01F 9/00 (2013.01); F02D 2041/281 (2013.01); F02D 2041/285 (2013.01); F02D 2041/288 (2013.01)

(58) Field of Classification Search
CPC ... F02M 35/10386; F02D 41/18; F02D 41/28; G01F 9/00
USPC ........................................................ 702/100
See application file for complete search history.

(56) References Cited

U.S. PATENT DOCUMENTS 6,804,997 B1    10/2004    Schwulst
7,225,793 B2     6/2007    Schwulst et al.
(Continued)

OTHER PUBLICATIONS

Flow Bench 101, 2008, Flow Performance, pp. 1-6. (Year: 2008).*

*Primary Examiner* — Michael P Nghiem
(74) *Attorney, Agent, or Firm* — Fay Sharpe LLP (57) ABSTRACT

A system, method and device for mass airflow sensor signal processing includes a microcontroller, a mass airflow sensor and an engine PCM. An analog-to-digital converter (ADC) converts a first output signal from the mass airflow sensor to a first $V_{DC}$ value. A digital-to-analog converter (DAC) converts a second $V_{DC}$ value to a second output signal associated with the mass airflow sensor. Transfer functions are obtained from a flow bench using the mass airflow sensor, performance air intake components, and stock air intake components. The microcontroller determines, from the first $V_{DC}$ value, a corresponding actual flow rate. From the actual flow rate, a corresponding stock $V_{DC}$ value is determined. The stock $V_{DC}$ value is then output to the DAC for conversion to the output second signal associated with the mass airflow sensor for communication to the engine PCM.

14 Claims, 7 Drawing Sheets

(51) Int. Cl.
*F02D 41/28* (2006.01)
*G01F 9/00* (2006.01)

(56) References Cited

U.S. PATENT DOCUMENTS

| | | | | |
|---|---|---|---|---|
| 2002/0056319 | A1* | 5/2002 | Kobayashi | G01F 1/6965 73/204.22 |
| 2004/0002821 | A1* | 1/2004 | Kanke | G01F 1/6845 702/45 |
| 2005/0072225 | A1* | 4/2005 | Kanke | G01F 1/6845 73/204.11 |
| 2006/0212250 | A1* | 9/2006 | Kobayashi | G01F 1/69 702/100 |
| 2007/0179728 | A1* | 8/2007 | Kanke | G01F 1/6965 702/100 |
| 2009/0248213 | A1* | 10/2009 | Gotoh | G05D 7/0635 700/282 |
| 2009/0299657 | A1* | 12/2009 | Mizutani | F02D 41/187 702/45 |
| 2012/0101745 | A1* | 4/2012 | Kohno | F02D 41/18 702/45 |
| 2016/0298561 | A1 | 10/2016 | Shirasaki et al. | |

* cited by examiner

MASS AIRFLOW SENSOR SIGNAL PROCESSING METHOD

This application claims priority from Provisional Application Ser. No. 62/278,211 which was filed on Jan. 13, 2016. The subject matter of this application is incorporated hereinto in its entirety.

BACKGROUND

The present disclosure relates to automotive arts, the signal processing arts, sensor arts, airflow arts, internal combustion engine arts, and the like.

Performance intake systems, or "cold air intakes," are very popular in the automotive aftermarket. These systems reduce pressure drop and supply cooler airflow to an internal combustion engine. This results in more efficiency and increased engine power. Tighter emission standards promulgated by environmental agencies are, however, making the manufacture of performance intake systems that require a mass airflow sensor difficult.

When an engine control system is being designed for a production vehicle, a mass airflow sensor, intake tube, and airbox are assembled to fit a particular engine. When this system is complete, the entire intake system is tested on a precision flow stand to extract the mass airflow sensor transfer function. This mass airflow transfer function is a set of voltage or frequency readings taken at different specific air flows. The data thus collected is used by the engine control system to control ignition timing, required fuel, and multiple emission parameters. Because of heightened emission standards, changes to emission parameters from aftermarket intake systems may cause a vehicle using such an aftermarket system to be noncompliant.

Most modern vehicles use an insert type of mass airflow sensor. This sensor is designed to be installed into the vehicle's air box. Normally, when an aftermarket intake system is designed, it is designed with larger diameter tubing and a higher flowing air filter. Since the output of a mass airflow sensor is proportional to the area of the tube into which it is installed, aftermarket intake system designers will select a portion of their intake tube and reduce that tube to the original size that the factory mass airflow sensor was originally installed into.

This process will generally reproduce the original equipment manufacturer (OEM) intake mass airflow transfer function, but because of the different airflow profiles at different velocities, it is not perfect. In the past, these manufacturers relied on oxygen sensor feedback and fuel trims to correct for this transfer function error.

The problem with this method is that it only corrects for proper air/fuel ratio. The MAF sensor is also used for calculating engine load, ignition timing, and multiple emission functions. In particular, more strict and demanding emission requirements are making it impossible for these aftermarket intake systems to pass EPA requirements.

What is needed is a system, method, and apparatus that will enable the manufacture of performance air intake systems which accurately measure the mass airflow into the engine.

BRIEF DESCRIPTION

In accordance with one embodiment, disclosed herein is a system for mass airflow sensor signal processing. The system includes a mass airflow sensor in fluid communication with a performance air intake and a performance intake tube, and a microcontroller in communication with the mass airflow sensor and an engine PCM. The system also includes an analog-to-digital converter (ADC) in communication between the mass airflow sensor and the microcontroller, the ADC converting an output first signal from the mass airflow sensor to a first $V_{DC}$ value, and a digital-to-analog converter (DAC) in communication between the microcontroller and the engine PCM, the DAC converting an output second $V_{DC}$ value to an output second signal associated with the mass airflow sensor. The system further includes memory in communication with the microcontroller, the memory storing a performance mass airflow transfer function for converting the first $V_{DC}$ value to a corresponding flow rate associated with the performance air intake and the performance intake tube, and a stock mass airflow transfer function for converting the flow rate to a corresponding second $V_{DC}$ value associated with a stock air intake and a stock intake tube. The microcontroller of the system converts the first $V_{DC}$ value from the ADC into an actual flow rate in accordance with the performance mass airflow transfer function and converts the actual flow rate into the output second $V_{DC}$ value to the DAC in accordance with the stock mass airflow transfer function.

According to another embodiment, there is disclosed a method for mass airflow sensor signal processing. The method includes the step of determining a stock mass airflow transfer function for a stock intake tube and a stock air intake from a stock mass airflow sensor via a flow bench. The method also includes the step of determining a performance mass airflow transfer function for a performance intake tube and a performance air intake from the stock mass airflow sensor via the flow bench. The method further includes the step of storing the stock mass airflow transfer function and the performance mass airflow transfer function in memory of an associated microcontroller.

In another embodiment, there is disclosed a method for mass airflow sensor signal processing. The method includes the step of receiving an output signal from a mass airflow sensor, the output signal generated by the mass airflow sensor responsive to a flow of air through a performance air intake and a performance intake tube, and converting, via an analog-to-digital converter, the received output signal to a performance $V_{DC}$ value. The method further includes the steps of converting, via a performance lookup table, the performance $V_{DC}$ value to an actual flow rate corresponding to a flow of air through the performance air intake and the performance intake tube, and determining, from the actual flow rate, a corresponding stock $V_{DC}$ value via a stock lookup table. In addition, the method includes the steps of converting the determined stock $V_{DC}$ value to a corresponding mass airflow sensor signal, and outputting the mass airflow sensor signal to an associated engine PCM.

In yet another embodiment, there is disclosed a mass airflow sensor signal processing device. The device includes a microcontroller that is in communication with a mass airflow sensor and an engine PCM. The device further includes an analog-to-digital converter (ADC) in communication between the mass airflow sensor and the microcontroller, the ADC converting an output first signal from the mass airflow sensor to a first $V_{DC}$ value. The device also includes a digital-to-analog converter (DAC) in communication between the microcontroller and the engine PCM, the DAC converting an output second $V_{DC}$ value to an output second signal associated with the mass airflow sensor, and memory in communication with the microcontroller, the memory storing instructions which are executed by the microcontroller. The instructions are executed by the microcontroller, causing the microcontroller to determine, from the first $V_{DC}$ value, a corresponding actual flow rate via a performance mass airflow transfer function, determine, from the actual flow rate, a corresponding stock $V_{DC}$ value via a stock mass airflow transfer function, and output the stock $V_{DC}$ value to the DAC for conversion to the output second signal associated with the mass airflow sensor for communication to the engine PCM.

In one aspect, the systems and methods set forth herein provide a method of manufacture that will take almost any aftermarket intake system and replicate the OEM MAF transfer function, by outputting correctly for a given mass flow.

In another aspect, a precision flow bench is utilized to obtain mass airflow transfer functions from a stock mass airflow sensor in performance air intake components and in stock air intake components.

These and other aspects will be apparent to those skilled in the art upon viewing the accompanying figures and descriptions set forth herein.

BRIEF DESCRIPTION OF THE DRAWINGS

The subject disclosure may take form in various components and arrangements of components, and in various steps and arrangements of steps. The drawings are only for purposes of illustrating the preferred embodiments and are not to be construed as limiting the subject disclosure.

DETAILED DESCRIPTION

The present disclosure may be understood more readily by reference to the following detailed description of desired embodiments included therein. In the following specification, and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The present disclosure may refer to flow rates for certain steps. It is noted that these generally refer to the rate that air flows through a defined area, e.g., air flowing through an intake tube, filter, etc., and do not necessarily refer to the volume of air available within such a defined area, nor the volume of air required by an internal combustion engine. Unless otherwise noted, all values of "flow" are in kilograms/hour (Kg/Hr).

Figure 1:
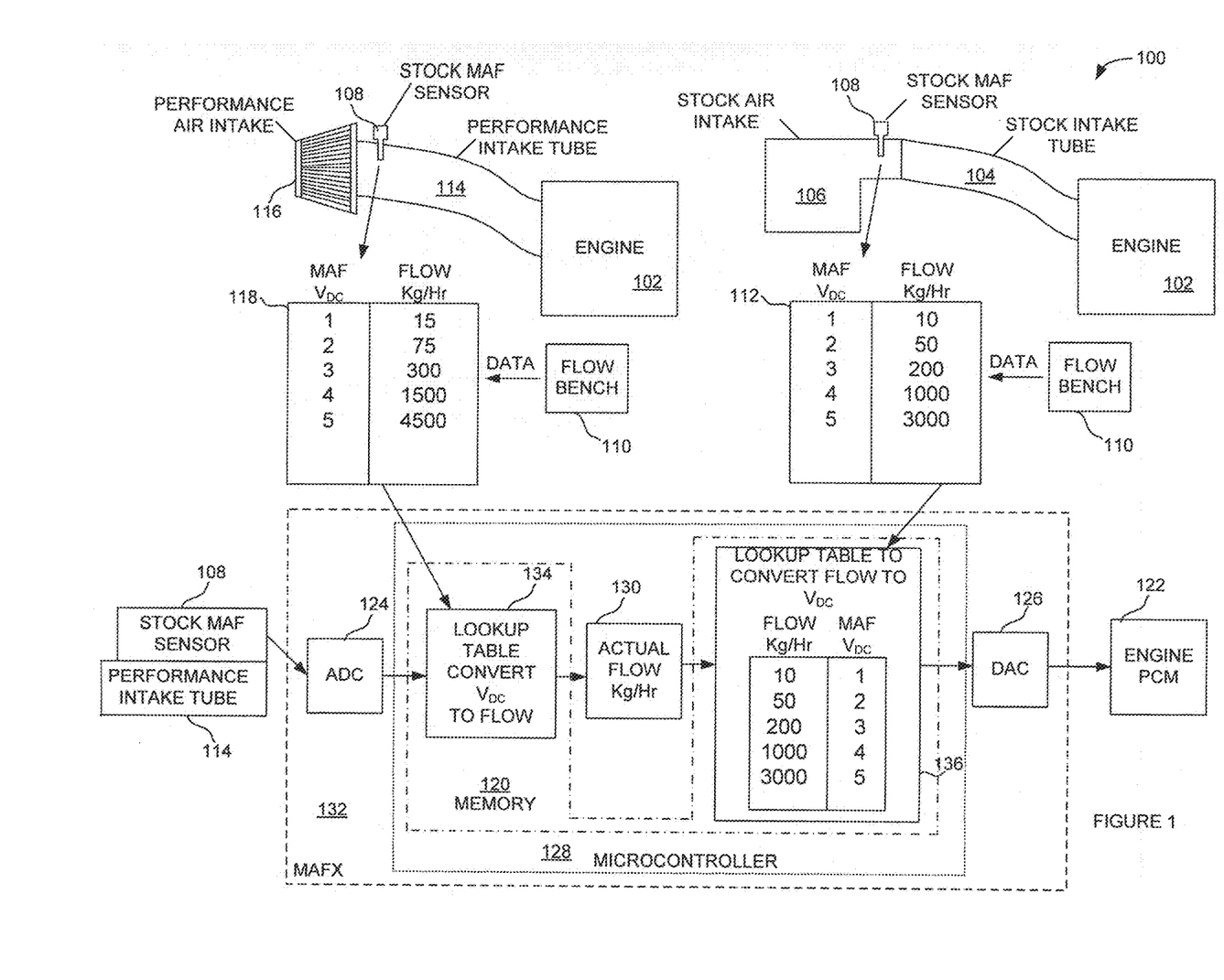
FIG. 1 illustrates a functional block diagram illustrating a system and method for mass airflow sensor signal processing in accordance with one aspect of the subject application.

Turning now to FIG. 1, there is shown a functional diagram of a system 100 in accordance with one embodiment of the subject application. As shown in FIG. 1, an engine 102, generally an internal combustion engine, e.g., gasoline, diesel, etc., is coupled to a stock air intake tube 104, stock air intake box 106 and a stock mass airflow ("MAF") sensor 108. As used herein, it will be appreciated that the term "stock" corresponds to the original equipment accompanying the engine 102 prior to any changes being made to the engine 102 after leaving the factory. Accordingly, the terms "stock" and "OEM" are used interchangeably.

In accordance with one aspect of the subject application, the stock intake tube 104, stock air intake 106, and stock MAF sensor 108 are operatively coupled to a flow bench 110. The flow bench 110 is representative of a precise means of measuring airflow through an object, particularly air intake systems of internal combustions engines. According to one embodiment, the flow bench 110 is an N.I.S.T. (National Institutes of Standards & Technology) traceable precision flow bench. A suitable example of such a flow bench 110 includes, for example and without limitation, a SUPERFLOW 1200 flow bench available from SuperFlow Dynamometers & Flowbenches of Des Moines, Iowa, or comparable such flow benches.

As depicted in FIG. 1, stock mass airflow transfer function data 112 is collected at multiple points, i.e., mass flow rates. That is, the actual airflow through the stock air intake 106 and stock intake tube 104 to the engine 102 is measured by the flow bench 110 and correlated to the corresponding output from the MAF sensor 108. It will be understood that the values depicted in FIG. 1 are intended as examples only, so as to provide an indication of the correlation between output signal of the MAF sensor 108 in $V_{DC}$ to the rate of air flowing (air flow) in Kg/Hr. Accordingly, the correspondence between, for example 1 $V_{DC}$ and 10 Kg/Hr is representative and not intended to indicate an actual correlation between 1 $V_{DC}$ of a MAF sensor 108 and 10 Kg/Hr through stock air intake components 104 and 106. Thus, the skilled artisan will appreciate that other stock air intakes, e.g., larger engines, turbo charged engines, etc., may have larger air intake components, thus changing the relative correlations. The systems and methods provided herein thus utilize the flow bench 110 method to ascertain the MAF sensor 108 signal output with the actual airflow for each particular OEM intake system and engine 102.

The stock mass airflow transfer function data 112 is then stored in memory 120 communicatively coupled to a microcontroller 128 of a converter 132, as illustrated in FIG. 1. In one embodiment, as shown in FIG. 1, the stock mass airflow transfer function data 112 is stored in memory 120 as a lookup table 136 to enable faster conversion of sensor output as described in greater detail below. The memory 120 may represent any type of non-transitory computer readable medium such as random access memory (RAM), read only memory (ROM), magnetic disk or tape, optical disk, flash memory, or holographic memory. In one embodiment, the memory 120 comprises a combination of random access memory and read only memory. In some embodiments, the microcontroller 128 and memory 120 may be combined in a single chip. The microcontroller 128 may include an analog-to-digital converter ("ADC") 124 in communication with the stock MAF sensor 108 and a digital-to-analog converter ("DAC") 126 in communication with the engine PCM 122, as illustrated in FIG. 1. Memory 120 may store data the processed by the method as well as the instructions for performing the exemplary method. As shown in the example embodiment of FIG. 1, the converter 132 comprises the microcontroller 128, the ADC 124, the DAC 126, the memory 120, and the corresponding data 112 and 118 and lookup tables 134 and 136.

Figure 2:
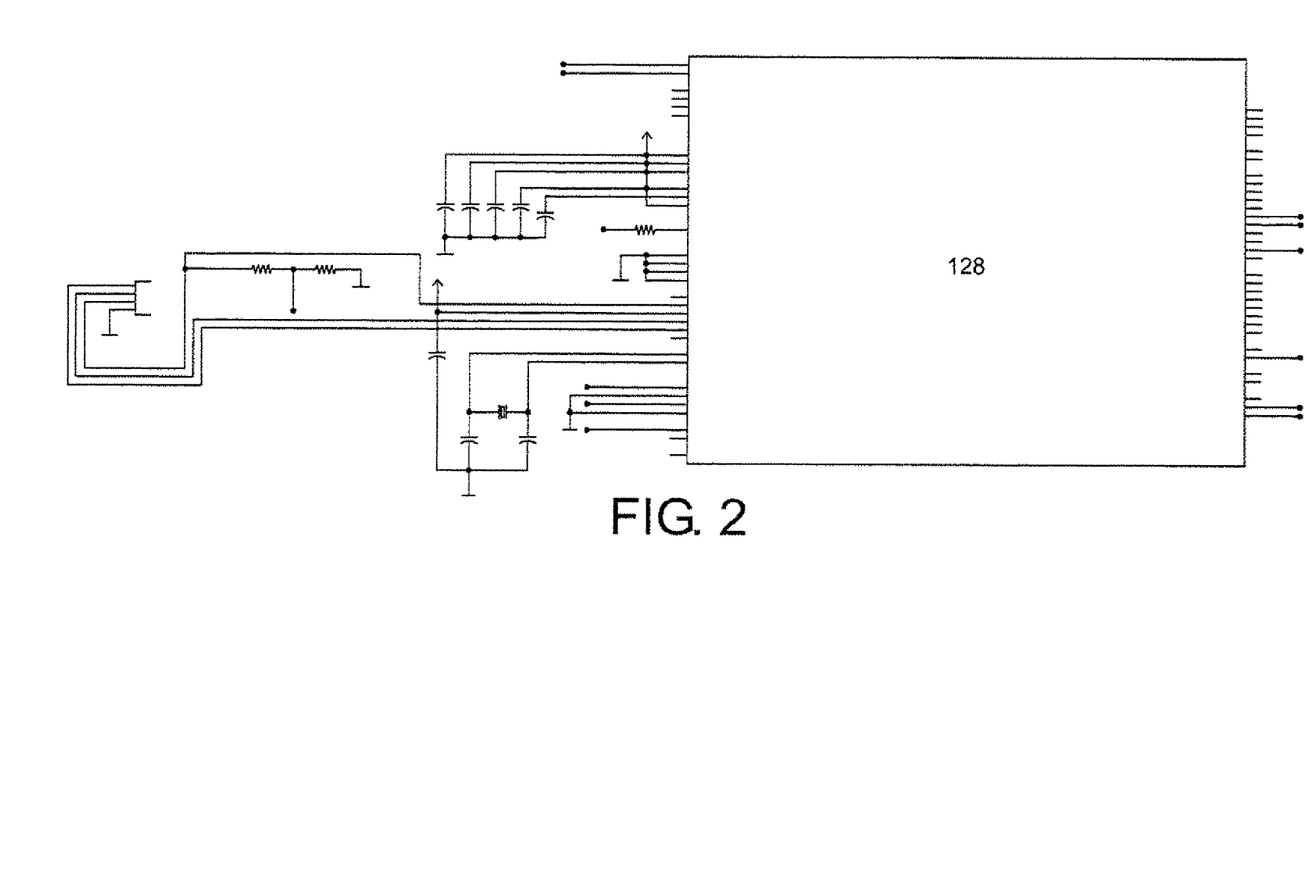
FIG. 2 illustrates an example circuit diagram of a microcontroller utilized in the system and method for mass airflow sensor signal processing in accordance with one aspect of the subject application.

The microcontroller 128 can be variously embodied, such as by a single core processor, a dual core processor (or more generally by a multiple core processor), a digital processor and cooperating math coprocessor, a digital controller, or the like. The microcontroller 128, in addition to storing various mass air flow transfer function data, e.g., data 112 and 118, may also perform a portion of the method outlined in FIG. 7. In accordance with one embodiment, the microcontroller 128 is a 16-bit or better microprocessor. In such an embodiment, the ADC 124 is a 16-bit analog-to-digital converter and the DAC 126 is a 10-bit or better digital-to-analog converter. An example of the circuitry comprising the microcontroller 128 is illustrated in FIG. 2. It will be appreciated that other ADCs and/or DACs, as well as microprocessors may be utilized in accordance with the subject systems and methods.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, and so forth, and is also intended to encompass so-called "firmware" that is software stored on a ROM and so forth. Such software may be organized in various ways, and may include software components organized as libraries, Internet-based programs stored on a remote server and so forth, source code, interpretive code, object code, directly executable code, and so forth. It is contemplated that the software may invoke system-level code or calls to other software residing on a server or other location to perform certain functions.

As further depicted in FIG. 1, a performance intake tube 114, performance air intake 116, and the stock MAF sensor 108 are operatively coupled to a flow bench 110. As previously discussed, the flow bench 110 is representative of a precise means of measuring airflow through an object, particularly air intake systems of internal combustions engines, e.g., a SUPERFLOW 1200 flow bench, or comparable such flow benches. Performance mass airflow transfer function data 118 is collected at multiple points, i.e., mass flow rates. That is, the actual airflow through the performance air intake 116 and the performance intake tube 114 to the engine 102 is measured by the flow bench 110 and correlated to the corresponding output from the MAF sensor 108. It will be understood that the values depicted in FIG. 1 are intended as examples only, so as to provide an indication of the correlation between output signal of the MAF sensor 108 in $V_{DC}$ to the rate of air flowing (air flow) in Kg/Hr. Accordingly, the correspondence between, for example 4 $V_{DC}$ and 1500 Kg/Hr is representative and not intended to indicate an actual correlation between 4 $V_{DC}$ of a MAF sensor 108 and 1500 Kg/Hr through the performance air intake components 114 and 116.

Thus, the skilled artisan will appreciate that other performance air intakes, e.g., larger engines, turbo charged engines, etc., may have larger air intake components, thus changing the relative correlations. It will further be appreciated that the performance components 114 and 116 output a substantially larger volume of air to the engine 102 than the stock components 104 and 106, for corresponding MAF sensor 108 output signals. The systems and methods provided herein thus utilize the flow bench 110 method to ascertain the MAF sensor 108 signal output with the actual airflow for each particular OEM intake system and engine 102. The performance mass airflow transfer function data 118 is then stored as a lookup table 134 in the memory 120 communicatively coupled to the microcontroller 128, as referenced above with respect to the stock mass airflow transfer function data 112.

In accordance with another embodiment, the MAF sensor 108 outputs a frequency (Hz) based signal. As will be understood by the skilled artisan, alternate MAF sensors 108, depending upon manufacturer and application, can be configured to output a variety of different outputs, e.g., $V_{DC}$, a frequency-based signal, or the like. When the systems and methods set forth herein are implemented utilizing an MAF sensor 108 that outputs frequency-based signals, the microcontroller 128 may receive the output from the MAF sensor 108 into a frequency counter portion thereof, in lieu of the ADC 124. The output to the engine PCM 122 would also be frequency-based, thus the microcontroller 128, e.g., the pulse-width modulation (PWM) component of the microcontroller 128, would output a frequency-based or digital output, thereby bypassing the DAC 126 illustrated in FIG. 1. It will be understood that in such an embodiment, the microcontroller 128 may store frequency to flow rate correlation data, wherein such data is obtained via the flow bench 110 in a manner similar to that of obtaining voltage described above.

Figure 3:
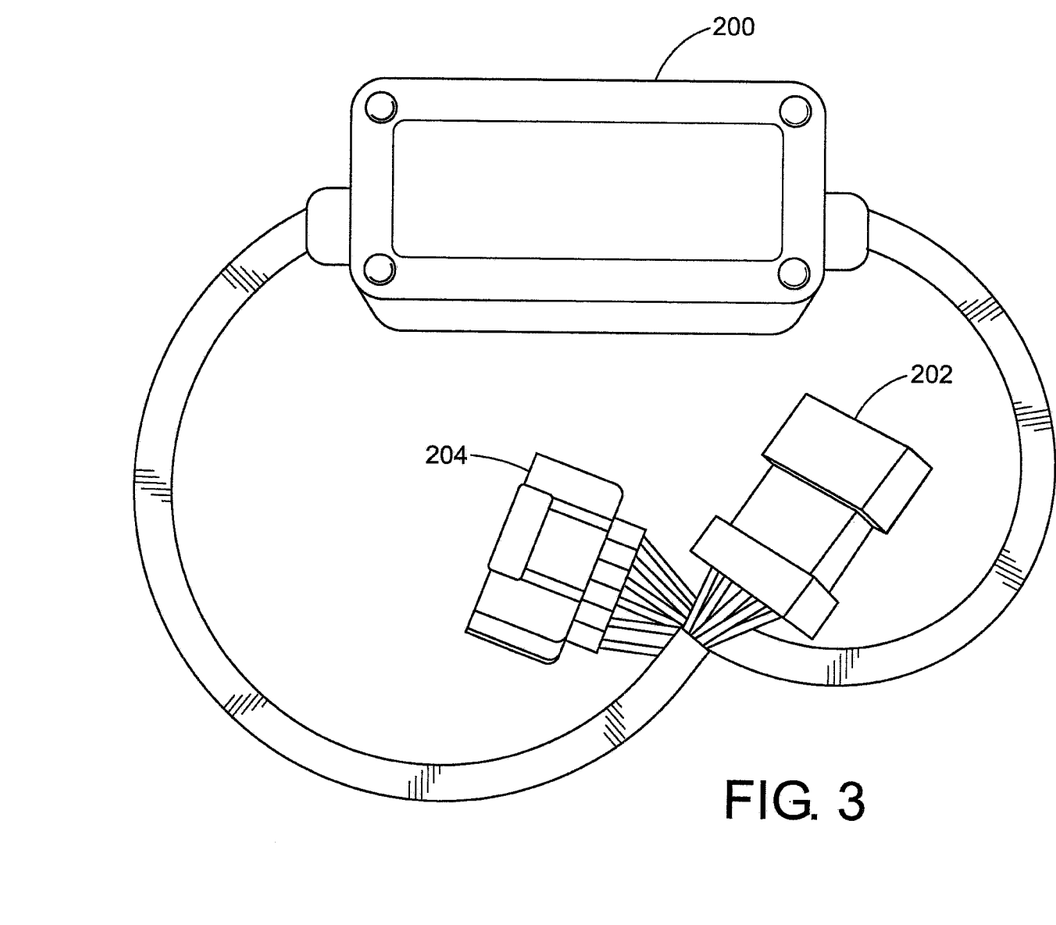
FIG. 3 is a top plan view of an enclosure holding a microcontroller, a memory, an ADC, a DAC, and suitable adaptors depicting an example implementation of a MAF converter utilized in the system and method for mass airflow sensor signal processing in accordance with one aspect of the subject application.

FIG. 3 provides an illustration of the converter 132, i.e., the microcontroller 128, memory 120, ADC 124, and DAC 126 components (illustrated in FIG. 1) encased in a suitable enclosure 200. The enclosure 200 includes an adapter 202 configured to couple to the stock MAF sensor 108, and a second adapter 204 configured to couple to the engine PCM 122. It will be appreciated that the illustration in FIG. 3 is representative only, and the adapters 202 and 204 may be different dependent upon the engine and manufacturer in which the system is implemented, e.g., FORD, NISSAN, HONDA, CORVETTE, JEEP, etc., may utilize different adapters and the subject systems and methods may be suitably configured to couple thereto.

Figure 4:
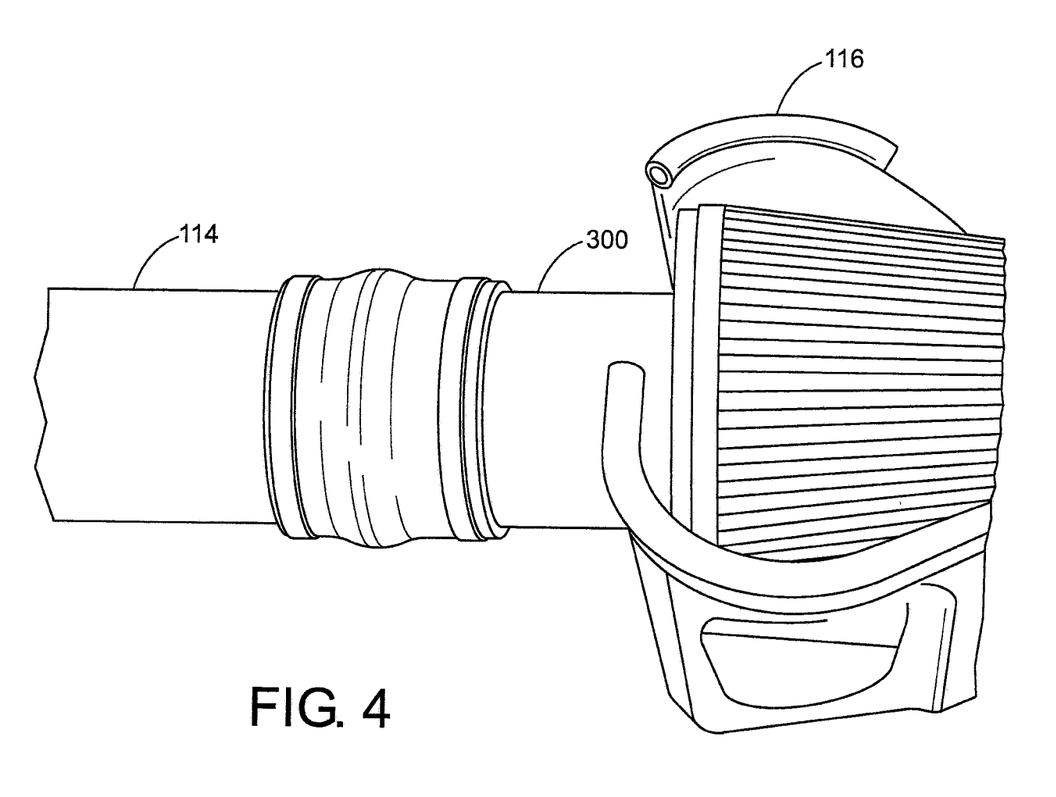
FIG. 4 is a perspective view of an intake tube, an air intake and a collar depicting an example implementation of the system and method for mass airflow sensor signal processing in accordance with one aspect of the subject application.
Figure 5:
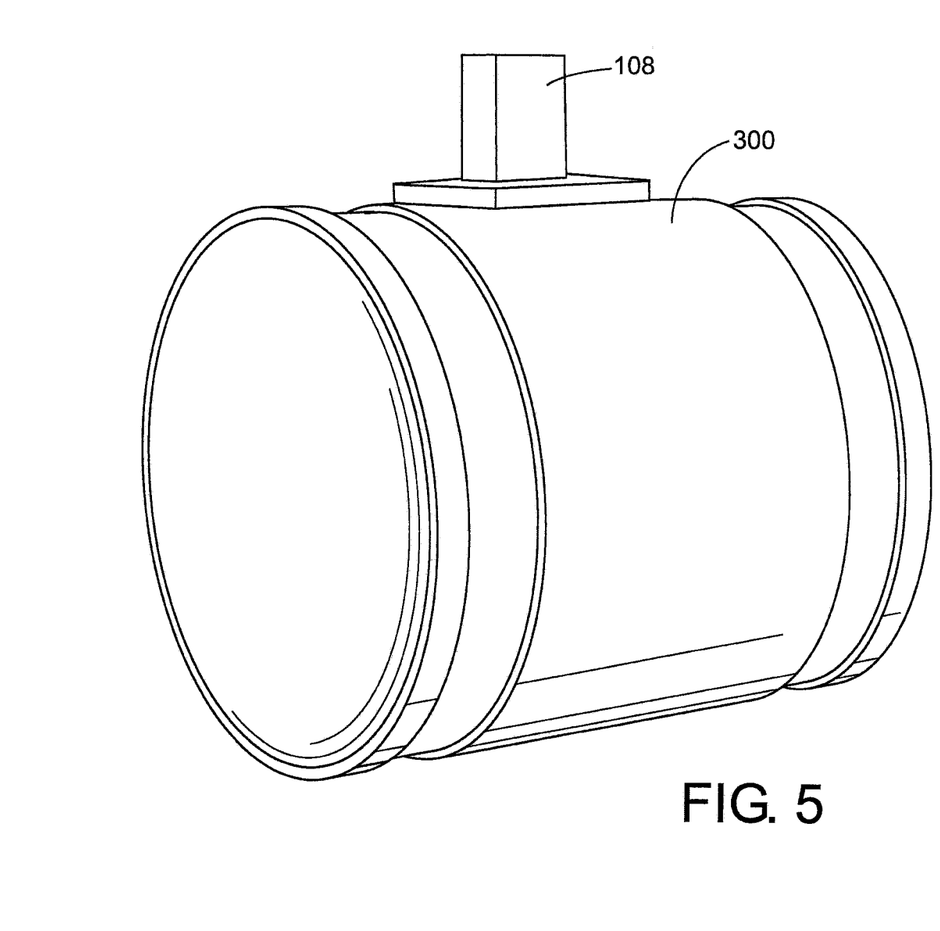
FIG. 5 is a perspective view of a collar and a mass airflow sensor incorporated into the performance air intake and performance intake tube components utilized by the system and method for mass airflow sensor signal processing in accordance with one aspect of the subject application.

FIG. 4 provides an illustration of a portion of the performance components 114 and 116, as well as a collar 300 coupling the air intake 116 to the intake tube 114 into which the stock MAF sensor 108 may be fitted. It will be understood that the collar 300 includes an opening (not shown) into which the stock MAF sensor 108 is fitted, mimicking the opening within the stock components 104 and 106. FIG. 5 provides an illustration of the collar 300 in isolation with the stock MAF sensor 108 attached thereto.

Returning to the illustrations of FIG. 1, including the examples shown in FIGS. 2-5, the when the performance air tube 114 and air intake 116 are coupled to the engine 102, replacing the stock components 104 and 106, the enclosure 200 is communicatively coupled to the stock MAF 108 in the collar 300 and to the engine PCM 122 via respective adapters 202 and 204. During operations of a vehicle utilizing the performance components 114 and 116, the microcontroller 128 receives, from the analog-to-digital converter 124, a voltage reading of the stock MAF sensor 108 from the performance intake 116. Then, using the aftermarket intake system mass air flow transfer function data 118 stored in memory 120 accessible by the microcontroller 128, this voltage ($V_{DC}$) is converted into an airflow value. Multiple readings are taken and an average is taken to smooth the value and eliminate any signal noise. Then, the stock mass airflow transfer function data 112, also stored in memory 120, is used by the microcontroller 128 to calculate the stock voltage output from that actual flow value. This voltage is then sent on to the engine control system (engine PCM 122) from the digital-to-analog converter (DAC 126).

Figure 6:
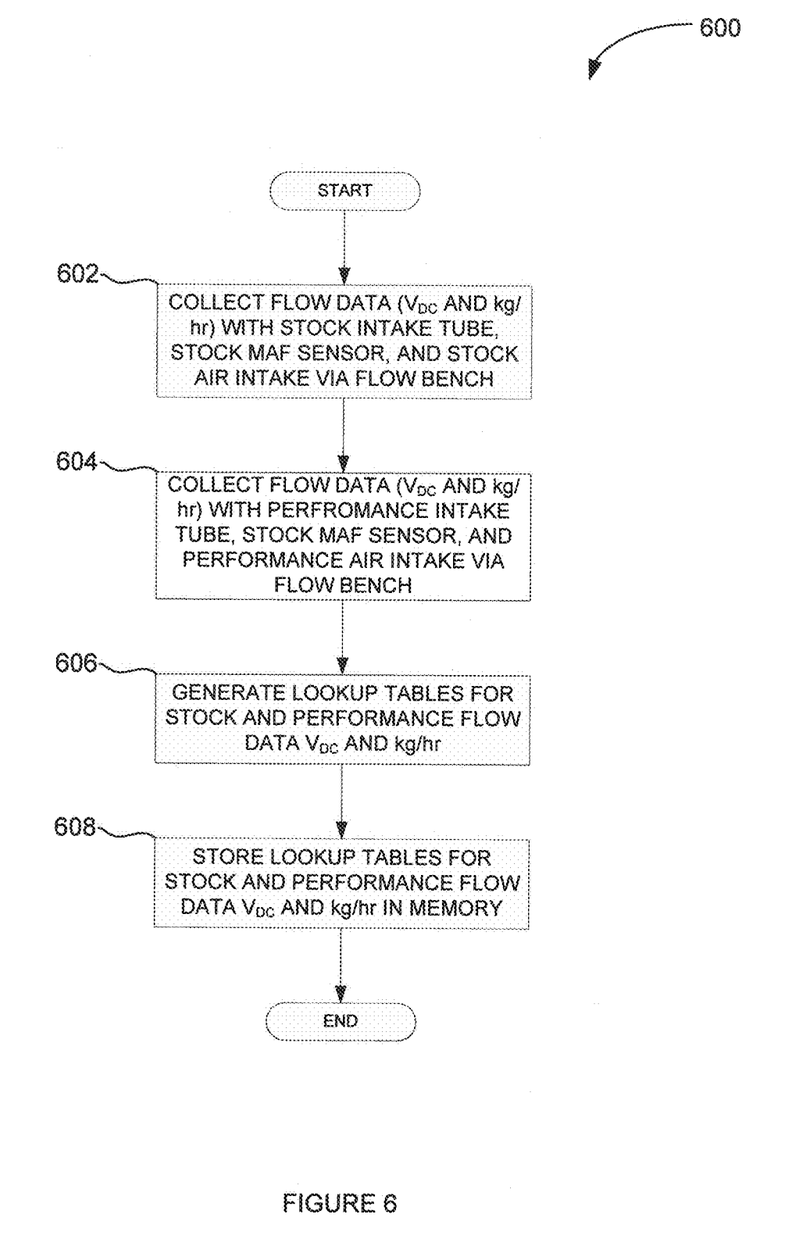
FIG. 6 is a flowchart illustrating a method for determining voltage and corresponding flow rates for stock and performance air intake components in accordance with one aspect of the subject application.

Turning now to FIG. 6, there is shown a method 600 for determining voltage and corresponding flow rates for stock and performance air intake components in accordance with one embodiment of the subject application. The methodology of FIG. 6 begins at 602, whereupon flow data 112 corresponding to the MAF sensor 108 $V_{DC}$ output and flow rate (Kg/Hr) is collected from the stock air intake 106 and stock intake tube 104 by the flow bench 110. At 604, flow data 118 is collected from by the flow bench from the MAF sensor 108 and performance air intake components 114 and 116. A computer (not shown) or component of the flow bench 110 generates a set of lookup tables 134 and 136 representative of the flow data 112 and 118 at 606. An illustration of such lookup tables is provided in FIG. 1. The lookup tables 134 and 136 corresponding to the flow data 112 and 118 are then stored, at 608, in memory 120 associated with the microcontroller 128. Operations with respect to FIG. 6 terminate thereafter and the microcontroller 128 and enclosed components, see, e.g., FIGS. 2-5, are then ready for installation with respect to the engine 102, performance air intake 116 and performance intake tube 114.

Figure 7:
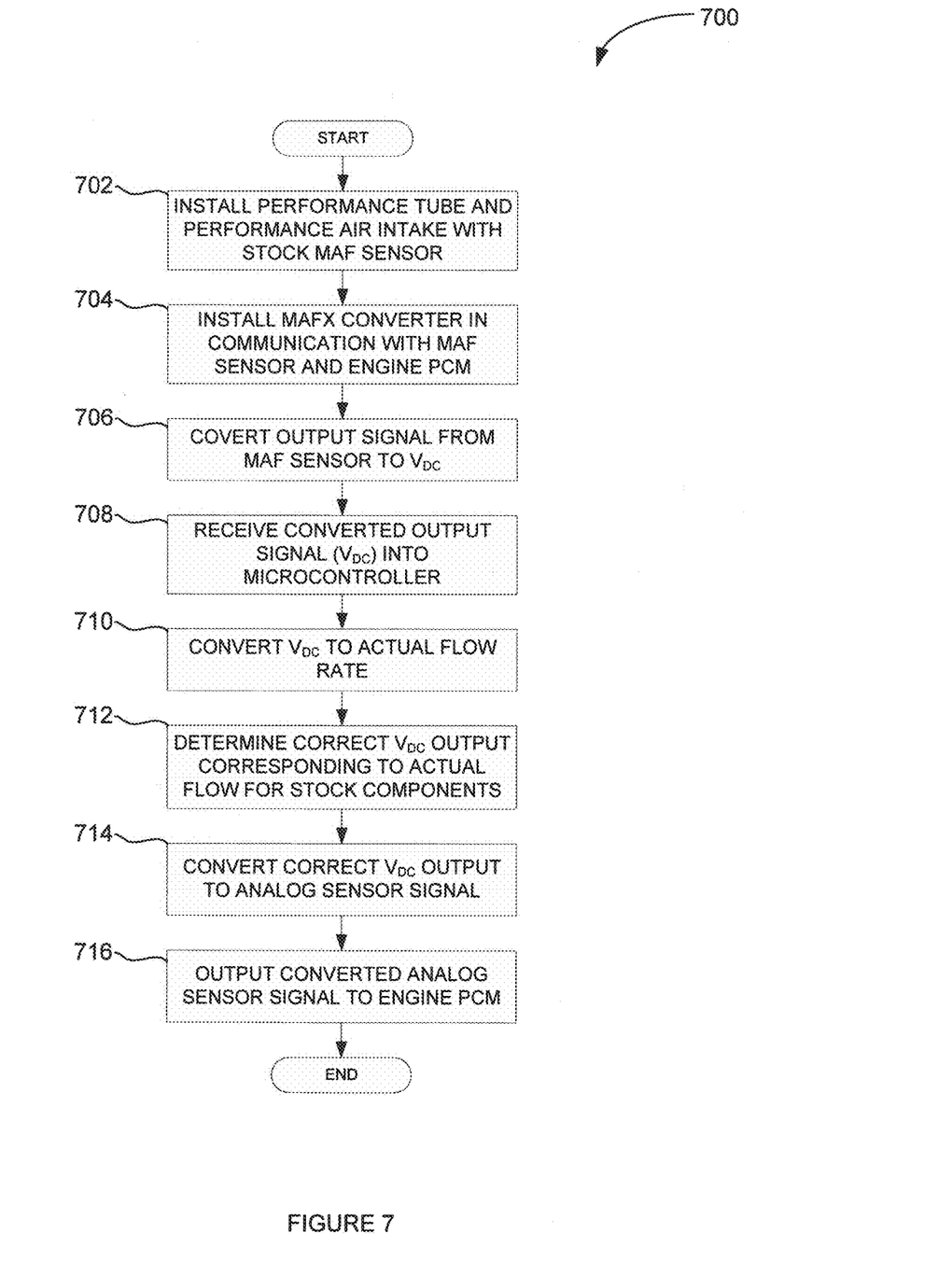
FIG. 7 is a flowchart illustrating a method for mass airflow sensor signal processing of performance intake components and a stock mass airflow sensor in accordance with one exemplary embodiment of the subject application.

Referring now to FIG. 7, there is shown a flowchart 700 depicting operations of the converter 132 in accordance with one embodiment of the subject application. That is, FIG. 7 illustrates a method for mass airflow sensor signal processing of performance intake components and a stock mass airflow sensor in accordance with one exemplary embodiment of the subject application. At 702, the performance intake tube 114 and performance air intake 116 are installed in place of the stock intake tube 104 and stock air intake 106 associated with the engine 102. The stock MAF sensor 108 is also installed in the collar 300 (shown in FIG. 5), between the performance intake tube 114 and the performance air intake 116. At 704, the converter 132 is attached to the stock MAF sensor 108 via adapter 202 from the converter enclosure 200 and to the engine PCM 122 via adapter 204. During operations of the engine 102, the microcontroller 128 of the converter 132 receives an output signal from the stock MAF sensor 108 and converts the signal, at 706 to a $V_{DC}$ value via the ADC 124 component.

The microcontroller 128 then receives the $V_{DC}$ value from the ADC 124 at 708, and at 710, converts the $V_{DC}$ value to an actual flow rate 130 of air through the performance air intake 116 and performance intake tube 114. According to one embodiment, this conversion is performed by the microcontroller 128 utilizing lookup table 134 generated from the performance mass airflow transfer function data 118 stored in memory 120 of the converter 132. In another embodiment, the microcontroller 128 utilizes the performance flow data 118 to calculate the appropriate actual flow rate 130, i.e., without use of a lookup table 134.

In one embodiment, multiple output signals are received into the ADC 124 from the stock MAF sensor 108 by the microcontroller 128. The microcontroller 128 may then perform multiple conversions of such output signals to performance $V_{DC}$ values. The microcontroller 128 would then perform multiple conversions via the performance lookup table 134 (or performance mass airflow transfer function calculations) of the performance $V_{DC}$ values to actual flow rates. Thereafter, averaging the actual flow rates by the microcontroller 128 determines the actual flow rate.

It will be appreciated that such an implementation smooths out the output signal received from the stock MAF sensor 108, reducing noise to allow for fluctuations in the airflow inherent in engine operations.

At 712, the microcontroller 128 determines, in accordance with the actual flow rate 130, the correct $V_{DC}$ value that represents the flow rate 130 using the stock mass airflow transfer function data 112, i.e., determining $V_{DC}$ value in the lookup table 136 corresponding to the actual flow rate 130. The $V_{DC}$ value determined at 712 is then converted, via the DAC 126 component of the converter 132 to an analog signal at 714. Thereafter, the analog signal is output to the engine PCM 122 for further analysis. That is, the engine PCM 122 is thereby informed as to the actual amount of air being supplied to the engine 102 by the performance components 114 and 116, allowing for adjustments in fuel, timing, and the like.

It is to be appreciated that in connection with the particular illustrative embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

In short, the present specification has been set forth with reference to preferred embodiments. Obviously, modifications and alterations will occur to others upon reading and understanding the present specification. It is intended that the disclosure be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

Further non-limiting disclosure is set forth in the following one-sentence statements formulated as patent claims.

What is claimed is:

1. A system for mass airflow sensor signal processing, comprising:
    a mass airflow sensor in fluid communication with a performance air intake and a performance intake tube;
    a microcontroller in communication with the mass airflow sensor and an engine powertrain control module (PCM);
    an analog-to-digital converter (ADC) in communication between the mass airflow sensor and the microcontroller, the ADC converting an output first signal from the mass airflow sensor to a first $V_{DC}$ value;
    a digital-to-analog converter (DAC) in communication between the microcontroller and the engine PCM, the DAC converting an output second $V_{DC}$ value to an output second signal associated with the mass airflow sensor; and
    memory within the microcontroller, the memory storing:
        a performance mass airflow transfer function for converting the first $V_{DC}$ value to a corresponding flow rate associated with the performance air intake and the performance intake tube, and
        a stock mass airflow transfer function for converting the flow rate to a corresponding second $V_{DC}$ value associated with a stock air intake and a stock intake tube;
    wherein the microcontroller converts the first $V_{DC}$ value from the ADC into an actual flow rate in accordance with the performance mass airflow transfer function and converts the actual flow rate into the output second $V_{DC}$ value to the DAC in accordance with the stock mass airflow transfer function;
    wherein the performance mass airflow transfer function is stored as a performance lookup table of a first $V_{DC}$ value to a corresponding flow rate associated with the performance air intake and the performance intake tube, and wherein the stock mass airflow transfer function is stored as a stock lookup table of flow rate to a corresponding second $V_{DC}$ value associated with the stock air intake and the stock intake tube;
    wherein the microcontroller converts the first $V_{DC}$ value from the ADC into an actual flow rate in accordance with the performance lookup table and converts the actual flow rate into the output second $V_{DC}$ value to the DAC; and
    wherein the performance mass airflow transfer function is received from a flow bench, the flow bench determining flow rates and first $V_{DC}$ values correlated to the mass airflow sensor in the performance air intake and the performance intake tube.

2. The system of claim 1, wherein the stock mass airflow transfer function is received from the flow bench, the flow bench determining flow rates and second $V_{DC}$ values correlated to the mass airflow sensor in the air intake and the stock intake tube.

3. The system of claim 2, wherein the flow bench is a precision flow bench.

4. A method for mass airflow sensor signal processing, comprising;
    receiving an output signal from a mass airflow sensor, the output signal generated by the mass airflow sensor responsive to a flow of air through a performance air intake and a performance intake tube;
    converting, via an analog-to-digital converter, the received output signal to a performance $V_{DC}$ value;
    converting, via a performance lookup table, the performance $V_{DC}$ value to an actual flow rate corresponding to a flow of air through the performance air intake and the performance intake tube;
    determining, from the actual flow rate, a corresponding stock $V_{DC}$ value via a stock lookup table;
    converting the determined stock $V_{DC}$ value to a corresponding mass airflow sensor signal;
    performing multiple conversions of received output signals to performance $V_{DC}$ values;
    performing multiple conversions via the performance lookup table of the performance $V_{DC}$ values to actual flow rates; and
    averaging the actual flow rates by the microcontroller to determine an average actual flow rate, wherein a corresponding stock $V_{DC}$ value is determined from the averaged actual flow rate; and
    outputting the mass airflow sensor signal to an associated engine powertrain control module (PCM).

5. The method of claim 4, wherein the performance lookup table is generated from performance mass airflow transfer data, said flow of air is collected by an associated flow bench.

6. The method of claim 4, wherein the stock lookup table is generated from stock mass airflow transfer data, said flow of air is collected by an associated flow bench.

7. The method of claim 4, wherein the stock lookup table and the performance lookup table are stored in memory associated with the microcontroller.

8. The method of claim 4, wherein the associated engine PCM utilizes the mass airflow sensor signal to adjust at least one engine operating parameters, said parameters including engine timing, exhaust, or fuel injection.

9. A mass airflow sensor signal processing device, comprising:
- a microcontroller in communication with a mass airflow sensor and an engine powertrain control module (PCM);
- an analog-to-digital converter (ADC) in communication between the mass airflow sensor and the microcontroller, the ADC converting an output first signal from the mass airflow sensor to a first $V_{DC}$ value;
- a digital-to-analog converter (DAC) in communication between the microcontroller and the engine PCM, the DAC converting an output second $V_{DC}$ value to an output second signal associated with the mass airflow sensor; and
- memory within the microcontroller, the memory storing instructions executed by the microcontroller to;
- determine, from the first $V_{DC}$ value, a corresponding actual flow rate via a performance mass airflow transfer function,
- determine, from the actual flow rate, a corresponding stock $V_{DC}$ value via a stock mass airflow transfer function, and
- output the stock $V_{DC}$ value to the DAC for conversion to the output second signal associated with the mass airflow sensor for communication to the engine PCM; and wherein the performance mass airflow transfer function is obtained from an associated flow bench, the performance mass airflow transfer function converting the first $V_{DC}$ value to a corresponding flow rate associated with the performance air intake and the performance intake tube.

10. The device of claim 9, wherein the stock mass airflow transfer function is obtained from the associated flow bench, the stock mass airflow transfer function converting the flow rate to a corresponding second $V_{DC}$ value associated with a stock air intake and a stock intake tube.

11. The device of claim 10, wherein the microcontroller converts the first $V_{DC}$ value from the ADC into an actual flow rate in accordance with the performance mass airflow transfer function and converts the actual flow rate into the output second $V_{DC}$ value to the DAC in accordance with the stock mass airflow transfer function.

12. The device of claim 10, wherein the performance mass airflow transfer function is stored in the memory as a performance lookup table of first $V_{DC}$ value to a corresponding flow rate associated with the performance air intake and the performance intake tube, and wherein the stock mass airflow transfer function is stored in the memory as a stock lookup table of flow rate to a corresponding second $V_{DC}$ value associated with the stock air intake and the stock intake tube.

13. The device of claim 12, wherein the microcontroller converts the first $V_{DC}$ value from the ADC into an actual flow rate in accordance with the performance lookup table and converts the actual flow rate into the output second $V_{DC}$ value to the DAC.

14. The device of claim 13, wherein the performance mass airflow transfer function is received from a flow bench, the flow bench determining flow rates and first $V_{DC}$ values correlated to the mass airflow sensor in the performance air intake and the performance intake tube.

\* \* \* \* \*